(12) United States Patent
Enomoto

(10) Patent No.: US 7,907,232 B2
(45) Date of Patent: Mar. 15, 2011

(54) LIQUID CRYSTAL DISPLAY DEVICE

(75) Inventor: Tetsuya Enomoto, Togane (JP)

(73) Assignee: Hitachi Displays, Ltd., Chiba (JP)

( * ) Notice: Subject to any disclaimer, the term of this patent is extended or adjusted under 35 U.S.C. 154(b) by 141 days.

(21) Appl. No.: 12/253,266

(22) Filed: Oct. 17, 2008

(65) Prior Publication Data

US 2009/0103002 A1 Apr. 23, 2009

(30) Foreign Application Priority Data

Oct. 19, 2007 (JP) ................................ 2007-272277

(51) Int. Cl.
*G02F 1/1333* (2006.01)
(52) U.S. Cl. ........................................................ 349/60
(58) Field of Classification Search .................... 349/58, 349/60
See application file for complete search history.

(56) References Cited

U.S. PATENT DOCUMENTS

| 7,692,732 B2 * | 4/2010 | Tsubokura et al. ............. 349/58 |
| 2008/0225199 A1 * | 9/2008 | Tsubokura et al. ............. 349/60 |
| 2008/0252811 A1 * | 10/2008 | Shang ............................. 349/60 |

FOREIGN PATENT DOCUMENTS

JP 05-066405 3/1993

* cited by examiner

*Primary Examiner* — Sung H Pak
(74) *Attorney, Agent, or Firm* — Antonelli, Terry, Stout & Kraus, LLP.

(57) ABSTRACT

A liquid crystal display device which prevents the occurrence of an abnormal display on a screen by interrupting the intrusion of a foreign material to a backlight portion arranged inside of a liquid crystal display panel is provided. By adopting the constitution which blocks the intrusion of a foreign material from a gap formed in a liquid crystal display panel by means of a spacer arranged between the liquid crystal display panel and a middle frame, the intrusion of the foreign material to a sheet portion of a backlight can be prevented.

10 Claims, 3 Drawing Sheets

LIQUID CRYSTAL DISPLAY DEVICE

CROSS-REFERENCE TO RELATED APPLICATION

The present application claims priority from Japanese application JP 2007-272277 filed on Oct. 19, 2007, the content of which is hereby incorporated by reference into this application.

BACKGROUND OF THE INVENTION

1. Field of the Invention

The present invention relates to a liquid crystal display device, and more particularly to the structure for preventing the intrusion of a foreign material such as dust which intrudes into a backlight portion arranged inside a liquid crystal display panel.

2. Background Art

A liquid crystal display device is, basically, an image display device which is configured such that liquid crystal is filled between two substrates consisting of a first substrate and a second substrate preferably formed of a glass substrate, and an image is displayed by making use of changing of the alignment direction of the liquid crystal corresponding to an electric field applied to the liquid crystal from pixel selection electrodes formed on the substrate. A currently most-popularly-used all transmissive liquid crystal display device adopts the structure where light which is projected from a backlight (light source) mounted on a back surface of a liquid crystal display element is polarized by approximately 90 degrees by a liquid crystal layer and is allowed to pass through a polarizer thus converting an electronic latent image into a visible image which can be observed with naked eyes.

In an image display device which uses a non-light-emitting type liquid crystal display panel, an electronic latent image formed on the liquid crystal display panel is visualized using an external illumination means. The external illumination means is constituted by arranging a lighting device on a back surface or a front surface of a liquid crystal display panel except for the structure which makes use of a natural light. Particularly, in a display device which required high brightness, the structure which arranges a lighting device on a back surface of a liquid crystal display panel constitutes a main stream. This lighting device is referred to as a backlight.

The backlight is roughly classified into a side-edge-type backlight and a direct-type backlight. The side-edge-type backlight adopts the structure where a linear light source represented by a cold cathode ray tube is arranged along a side edge portion of a light guide plate formed of a transparent plate, and is popularly used as a display device which is requested to satisfy a demand of the reduction of thickness of a display device such as a personal computer. On the other hand, in a large-sized liquid crystal display device such as a display device used in a display monitor or a television receiver set, a direct-type backlight is popularly used. The direct-type backlight adopts the structure where a light source is arranged directly below a back surface side of a liquid crystal display panel.

In the liquid crystal display device, a liquid crystal display panel and a backlight are integrally formed for realizing the narrow picture frame and the reduction of weight of the liquid crystal display device. The liquid crystal display panel is held and fixed by being housed in a frame-shaped metal frame which is formed of a metal-plate molded body. The backlight adopts the structure where the backlight is mechanically fixed to a frame-shaped mold casing by fitting engagement or using bolts.

This type of liquid crystal display device is used, for example, as a monitor of medical equipment which is formed by assembling a liquid crystal display panel and a backlight in a casing. In the monitor, a plurality of air-cooling fans is arranged in the inside of the casing. These fans are used as an outside air suction fan and an air exhaust fan for cooling the inside of the monitor. Conventionally, when such a cooling fan is operated, a foreign material such as dust floating outside is sucked into the inside of the monitor and the foreign material is circulated in the inside of the monitor. Accordingly, the foreign material sucked into the inside of the monitor intrudes between a liquid crystal display panel and a backlight through a gap formed in the liquid crystal display panel.

To overcome this drawback, JP-A-5-66405 (patent document 1) discloses a liquid crystal display device which sequentially arranges a backlight and a liquid crystal display element on a printed circuit board, wherein a wall which is hermetically adhered to the liquid crystal display element is arranged outside a display screen of a diffusion plate which constitutes a backlight thus preventing the intrusion of a foreign material into the inside of the liquid crystal display device.

SUMMARY OF THE INVENTION

According to the present invention, there a liquid crystal display device which includes: a liquid crystal display panel; a drive printed circuit board which is arranged adjacent to the liquid crystal display panel and on which a drive circuit element for driving the liquid crystal display panel is mounted; a backlight which is arranged on a back surface of the liquid crystal display panel and includes at least one light emitting element which radiates illumination light to a back surface of the liquid crystal display panel; a frame-shaped mold frame which mounts the liquid crystal display panel and the drive printed circuit board thereon and houses the backlight therein; a metal frame which forms a picture frame for exposing an effective display region of the liquid crystal display panel, has a side wall which extends on a mold frame side, and is fixed to the mold frame; and an insertion member which is arranged between the liquid crystal display panel and the mold frame.

DESCRIPTION OF THE PREFERRED EMBODIMENTS

Figure 1:
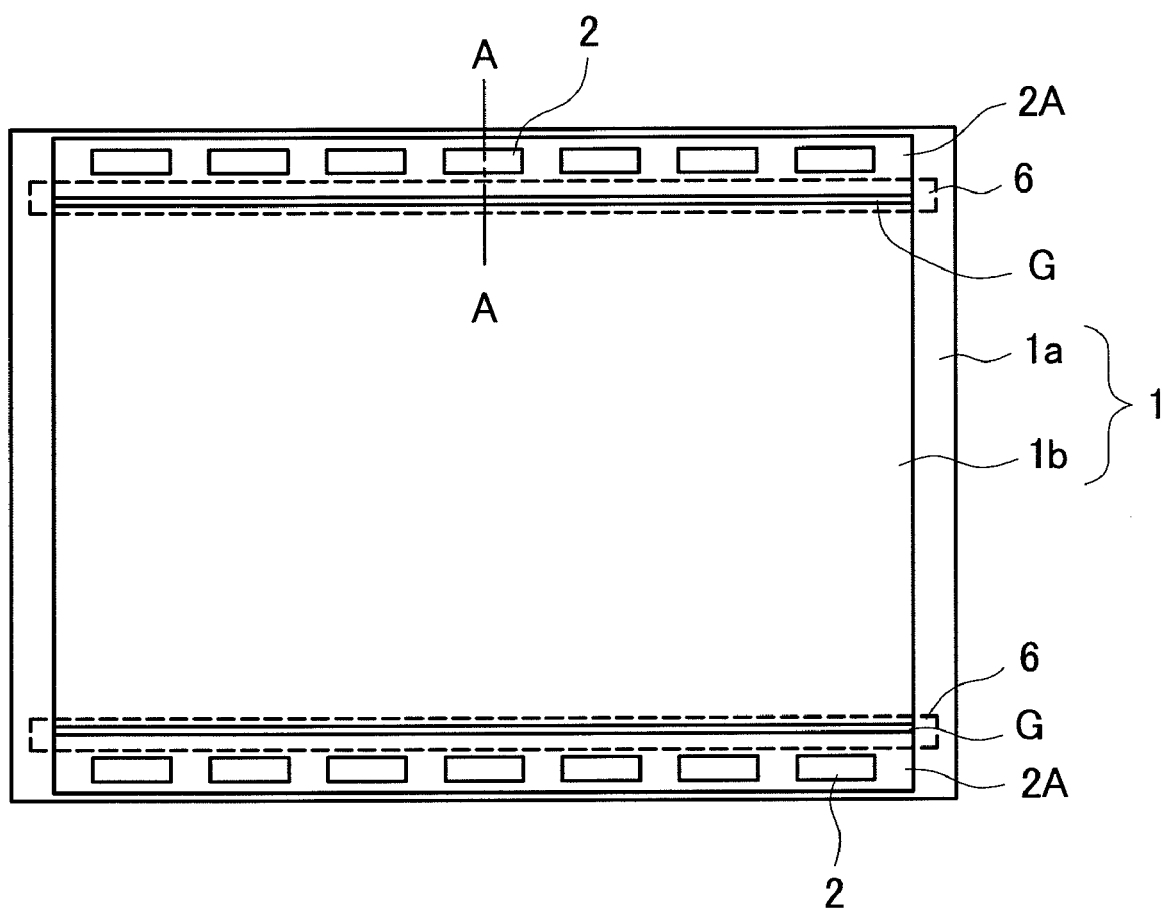
FIG. 1 is a schematic plan view of an essential part of a liquid crystal display device according to the present invention as viewed from above for explaining the constitution of one embodiment of the liquid crystal display device.

When a state that a foreign material intrudes into the inside of the liquid crystal display panel assembly continues for a long time, the foreign material intrudes into the backlight which constitutes a light source thus blocking a light-source light from the backlight. Due to such blocking of the light-source light from the backlight, there arises a drawback that an abnormal display state including a phenomenon that an image displayed on a display screen of the liquid crystal display panel becomes unclear occurs. Here, the liquid crystal display panel assembly (or the liquid crystal display device) is the structure which is the combination of the liquid crystal display panel and the backlight.

Accordingly, the present invention has been made to overcome the above-mentioned drawbacks of the related art and it is an object of the present invention to provide a liquid crystal display device which can prevent the occurrence of an abnormal display of a screen by preventing the intrusion of a foreign material into a backlight portion arranged inside a liquid crystal display panel assembly.

To overcome the above-mentioned object, according to a first aspect of the present invention, there is provided a liquid crystal display device which includes: a liquid crystal display panel; a drive printed circuit board which is arranged adjacent to the liquid crystal display panel and on which a drive circuit element for driving the liquid crystal display panel is mounted; a backlight which is arranged on a back surface of the liquid crystal display panel and includes at least one light emitting element which radiates illumination light to a back surface of the liquid crystal display panel; a frame-shaped mold frame which mounts the liquid crystal display panel and the drive printed circuit board thereon and houses the backlight therein; a metal frame which forms a picture frame for exposing an effective display region of the liquid crystal display panel, has a side wall which extends on a mold frame side, and is fixed to the mold frame; and an insertion member which is arranged between the liquid crystal display panel and the mold frame. Due to such constitution, an intrusion path of a foreign material is blocked and hence, the present invention can overcome the drawbacks of the related art.

According to another aspect of the present invention, in the liquid crystal display device having the above-mentioned constitution, it is preferable that the insertion member has one portion thereof projected from the liquid crystal display panel and another portion thereof sandwiched between the drive printed circuit board and the mold frame thus holding and fixing the insertion member.

According to another aspect of the present invention, in the liquid crystal display device having the above-mentioned constitution, it is preferable that the insertion member is sandwiched in a state that a portion of the insertion member is engaged with a projecting portion integrally formed with the mold frame or the liquid crystal display panel.

According to another aspect of the present invention, in the liquid crystal display device having the above-mentioned constitution, it is preferable that the insertion member is a spacer.

According to another aspect of the present invention, in the liquid crystal display device having the above-mentioned constitution, it is preferable that the spacer is made of foamed rubber having resiliency.

According to another aspect of the present invention, in the liquid crystal display device having the above-mentioned constitution, it is preferable that the backlight is a side-light-type backlight which uses a fluorescent discharge lamp.

According to another aspect of the present invention, in the liquid crystal display device having the above-mentioned constitution, it is preferable that the backlight is a direct-light-type backlight which uses a fluorescent discharge lamp.

The present invention is not limited to the above-mentioned constitutions and various modifications are conceivable without departing from a technical concept of the present invention.

According to the present invention, even when a foreign material intrudes into a gap defined between the liquid crystal display panel and the drive printed circuit board and the mold casing, an intrusion path is blocked by the insertion member before the foreign material intrudes into the inside of the backlight and hence, the intrusion of the foreign material into the inside of the backlight can be completely prevented thus giving rise to an extremely advantageous effect that an abnormal display on a screen can be surely prevented.

Hereinafter, preferred embodiments of the present invention are explained in detail in conjunction with drawings.

Figure 2:
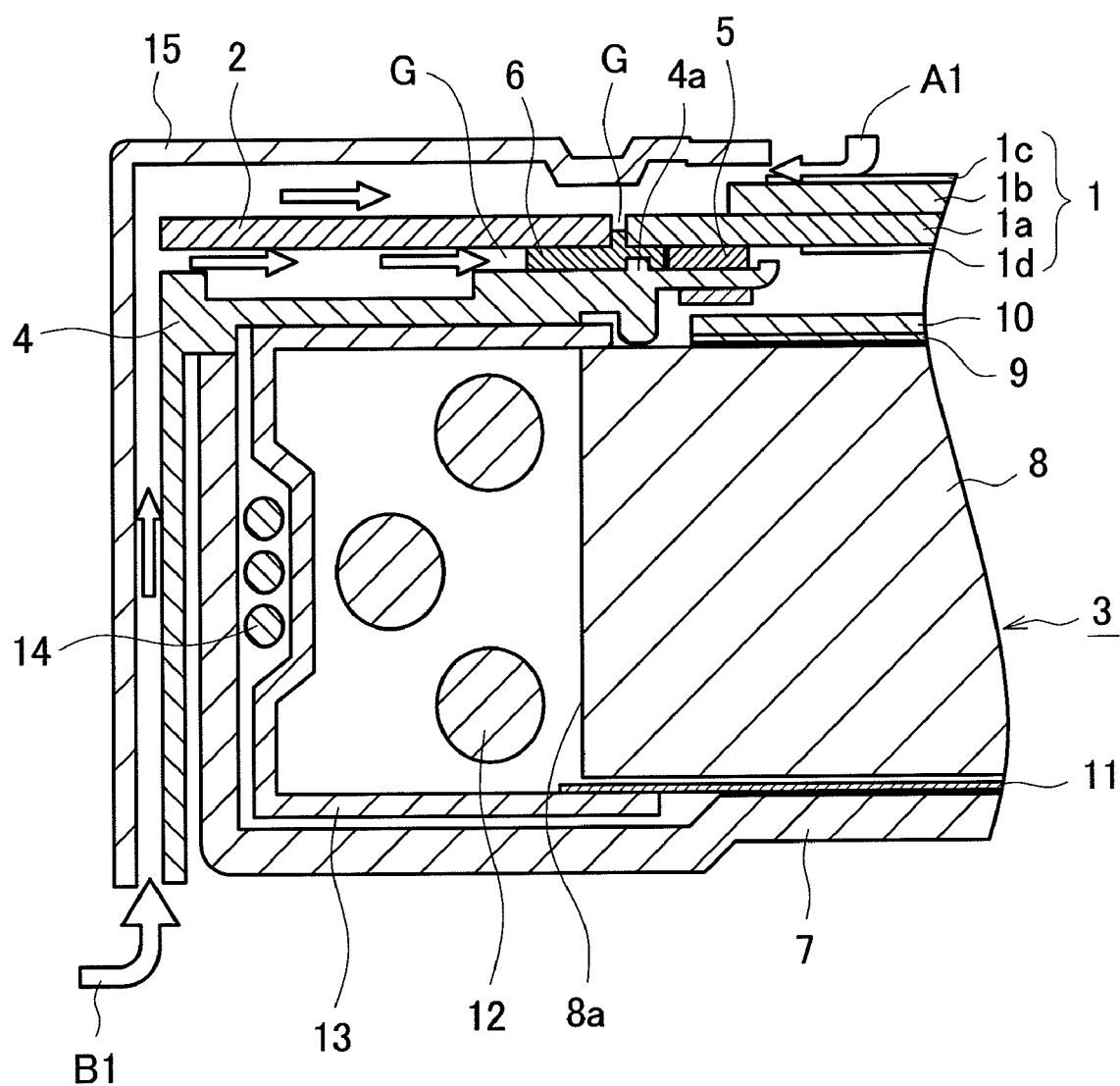
FIG. 2 is an enlarged cross-sectional view of an essential part of the liquid crystal display device shown in FIG. 1 taken along a line A-A in a long-side direction of the liquid crystal display device.

FIG. 1 is a schematic plan view of an essential part of a liquid crystal display device according to the present invention as viewed from above for explaining the constitution of one embodiment of the liquid crystal display device. In FIG. 1, an upper frame which covers the whole liquid crystal display panel is omitted. Further, FIG. 2 is an enlarged cross-sectional view of an essential part of an upper end portion of the liquid crystal display device shown in FIG. 1 taken along a line A-A. In FIG. 2, an ornamental casing and the like arranged on the upper frame which covers the liquid crystal display panel are omitted.

In FIG. 1 and FIG. 2, the liquid crystal display device is substantially constituted of a liquid crystal display panel 1 which displays an image, a plurality of drive circuits 2 for driving the liquid crystal display panel 1, and a backlight 3 which radiates a light-source light to a back surface of the liquid crystal display panel 1. The liquid crystal display panel 1 is configured such that a liquid crystal display element is constituted by sandwiching liquid crystal between a pair of transparent glass substrates 1a, 1b on which pixel forming electrodes are formed, and a pair of polarizers 1c, 1d is mounted on front and back surfaces of the liquid crystal display element by adhesion. Further, the drive circuits 2 each of which mounts an electronic circuit and the like thereon for driving the liquid crystal display panel 1 are arranged adjacent to the liquid crystal display panel 1 along outer sides of the liquid crystal display panel 1 in the horizontal direction.

The drive circuits 2 are configured such that the plurality of drive circuits 2 are arranged on a strip-shaped flexible printed circuit board 2A at approximately equal intervals, and the flexible printed circuit board 2A is arranged on respective upper and lower end portions in the long-side direction of the liquid crystal display panel 1. Further, the liquid crystal display panel 1, the drive circuits 2 and the like are held on and fixed to an upper surface of a frame-shaped middle frame formed of a resin molded body by way of a support member 5 such as spacers or a double-coated tape, for example, in a state that these members are arranged in the approximately same plane.

Further, with respect to the arrangement relationship between the liquid crystal display panel 1 and the drive circuit 2 which are arranged in the approximately same plane on the upper surface of the middle frame 4, gaps G are formed between the liquid crystal panel 1 and the drive circuit 2 as well as between the drive circuit 2 and the middle frame 4 to afford the tolerance to the assembling of the liquid crystal display panel 1, the drive circuits 2 and the middle frame 4. Further, as an insertion member which has resiliency so as to sufficiently cover widths of these gaps G, a strip-shaped spacer 6 which is formed of a foamed-rubber molded body, for example, is arranged between the liquid crystal display panel 1 and the drive circuit 2 and the middle frame 4.

The drive circuits 2 are arranged on the flexible printed circuit board 2A which is arranged on the respective upper and lower end portions of the liquid crystal display panel 1. The drive circuits 2 are arranged along the long side of the display panel at approximately equal intervals. The spacer 6 is arranged so as to be sandwiched between the flexible printed circuit board 2A on which the drive circuits 2 are mounted and the liquid crystal display panel 1. Here, widths of the gaps G fall within a range from approximately 0.3 mm to 0.4 mm and hence, a member having a width of approximately 3 mm and a thickness of approximately 1 mm is used as the spacer 6.

To be more specific, the spacer 6 is fixed to the liquid crystal display panel 1 using an adhesive agent or the like, and is sandwiched between the liquid crystal display panel 1 and an upper surface of the middle frame 4. Further, a portion of the outer peripheral-side of the spacer 6 is made to project from the liquid crystal display panel 1 side in the horizontal direction such that the portion is embedded in the gap defined between the drive circuit 2 and the middle frame 4. This embodiment adopts the structure which obviates the direct fixing of the spacer 6 and the drive circuit 2 using an adhesive material or the like. Such structure is desirable from a viewpoint of the reduction of a stress applied to the drive circuit 2, the prevention of the occurrence of the connection failures or the like.

Further, in the inside of the frame-shaped middle frame 4 on which the liquid crystal display panel 1 and the drive circuit 2 are mounted, a frame-shaped lower frame 7 formed of a metal-plate molded body is arranged in a fixed manner, and the backlight 3 is arranged in the inside of the lower frame 7. In the backlight 3, a light guide plate 8 formed of a molded body made of a light transmitting resin material which guides light toward a back surface of the liquid crystal display panel 1 is arranged.

On a front surface side which faces a back surface of the liquid crystal display panel 1 of the light guide plate 8 in an opposed manner, a diffusion plate 9 which diffuses light in the light guide plate 8 and an optical compensation sheet stacked body 10 are arranged in a stacked manner. Further, on a bottom surface side of the light guide plate 8, a light reflection plate 11 which reflects light guided to the inside of the light guide plate 8 toward a back surface side of the liquid crystal display panel 1 is mounted by adhesion or the like.

Further, on one short side of the light guide plate 8, for example, a plurality of fluorescent discharge lamps 12 which constitutes light emitting elements which radiate light toward the inside of the light guide plate 8 are arranged along the long-side direction of the liquid crystal display panel 1. Further, a lamp reflector 13 which forms a reflection surface on an inner-wall-surface side thereof is mounted on one short side of the light guide plate 8. A recessed portion is integrally formed on a portion of an outer surface of the lamp reflector 13, and cables 14 which supply predetermined electricity to the fluorescent discharge lamps 12 are inserted into the recessed portion.

A light-source light radiated from the plurality of fluorescent discharge lamps 12 is made incident on the light guide plate 8 through a light incident surface 8a, and a reflection light from the reflection surface in the lamp reflector 13 and the light reflection plate 11 is introduced into the light guide plate 8, and the reflection light is reflected on the back surface of the diffusion plate 9 thus constituting the side-light-type backlight 3.

Further, the middle frame 4 on which the liquid crystal display panel 1 and the drive circuit 2 are mounted is covered with an upper frame 15 which is formed of a metal-plate molded body having an opening portion through which an effective display region of the liquid crystal display panel 1 is exposed, and the upper frame 15 is integrally formed with the middle frame 4 and the lower frame 7 to constitute the liquid crystal display device.

Figure 3:
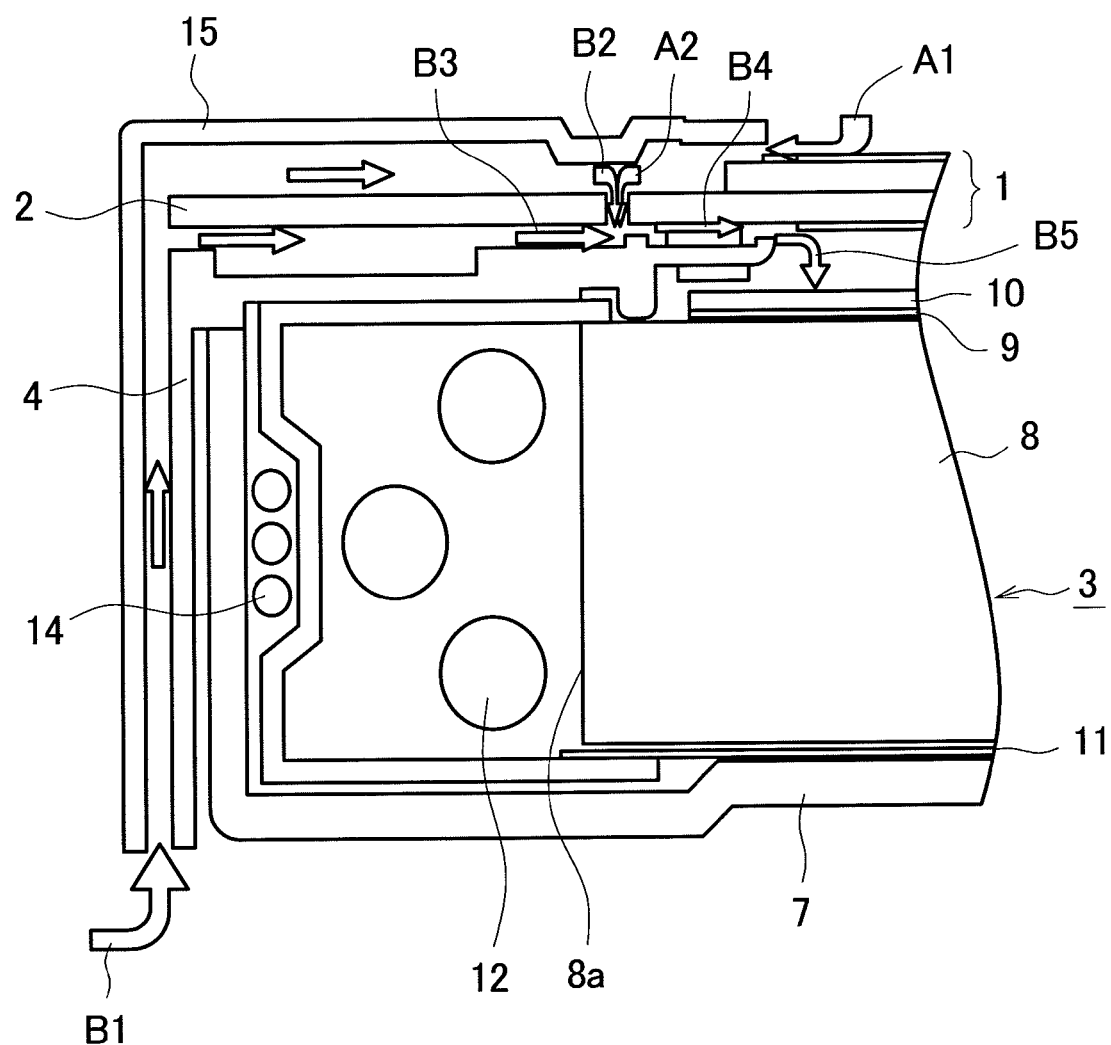
FIG. 3 is an enlarged cross-sectional view of an essential part for explaining the manner of operation and advantageous effects of the liquid crystal display device according to the present invention.

In such constitution, a foreign material such as dust floating in a peripheral portion of the liquid crystal display device as shown in FIG. 3, for example, a foreign material which floats in the vicinity of the liquid crystal display panel 1 intends to intrude into a gap formed between the upper frame 15 and the liquid crystal display panel 1 from a path A1 indicated by a blanked arrow, and intends to intrude into a sheet portion (the diffusion plate 9 and the optical compensation sheet stacked body 10) on the backlight 3 by way of a path A2 which passes through a gap formed between the drive circuit 2 and the liquid crystal display panel 1.

On the other hand, a foreign material such as dust floating in a peripheral portion of the liquid crystal display device, for example, a foreign material floating in peripheral portion of the backlight 3 intends to intrude in the vertically branched manner with respect to the drive circuit 2 by way of a gap formed between wall surfaces of the upper frame 15 and the middle frame 4 through a path B1 indicated by a blanked arrow, and one branched foreign material intends to intrude into the sheet portion of the backlight 3 by way of a path B2 which passes through a gap formed between the flexible printed circuit board 2A and the liquid crystal display panel 1 by way of a gap defined between the upper frame 15 and the drive circuit 2. Further, another branched foreign material intends to intrude into the sheet portion on the light guide plate 8 by way of a path B3 which passes through a gap formed between the drive circuit 2 and the middle frame 4 and, further, by way of a path B4 and a path B5.

According to this embodiment, as shown in FIG. 1 and FIG. 2, by arranging the spacer 6 such that the spacer 6 covers the gaps G defined between the liquid crystal display panel 1, the flexible printed circuit board 2A and the middle frame 4, an intrusion path of the foreign material from the gap of the liquid crystal display panel 1 is interrupted and hence, the intrusion of the foreign material such as dust between the sheet portion of the backlight 3 and the back surface of the liquid crystal display panel 1 becomes completely impossible.

Due to such constitution, the intrusion of the foreign material into the sheet portion of the backlight 3 can be prevented and hence, the adhesion of the foreign material to the sheet portion on the backlight 3 can be eliminated. Further, the light-source light is no more blocked and hence, the occurrence of an abnormal display of the screen can be surely prevented.

In the above-mentioned embodiment, the side-edge-type backlight which uses the fluorescent discharge lamps is used as a backlight has been explained. However, the present invention is not limited to such constitution, and is applicable to a direct-type backlight. Further, it is needless to say that the present invention is applicable to a case in which other light emitting elements such as light emitting diodes are used in place of the fluorescent discharge lamps.

What is claimed is:
1. A liquid crystal display device comprising:
   a liquid crystal display panel;
   a drive printed circuit board which is arranged adjacent to the liquid crystal display panel and on which a drive circuit element for driving the liquid crystal display panel is mounted;
   a backlight which is arranged on a back surface of the liquid crystal display panel and includes at least one light emitting element which radiates illumination light to a back surface of the liquid crystal display panel;

a frame-shaped mold frame which mounts the liquid crystal display panel and the drive printed circuit board thereon and houses the backlight therein;

a metal frame which forms a picture frame for exposing an effective display region of the liquid crystal display panel, has a side wall which extends on a mold frame side, and is fixed to the mold frame; and an insertion member which is arranged between the liquid crystal display panel and the mold frame;

wherein the liquid crystal display panel and the drive printed circuit board are mounted on a same surface of the mold frame so as to delimit a gap between the liquid crystal display panel and the drive printed circuit board; and wherein the insertion member covers the gap formed between the liquid crystal display panel and the drive printed circuit board.

2. A liquid crystal display device according to claim 1, wherein one portion of the insertion member is sandwiched between the drive printed circuit board and the mold frame.

3. A liquid crystal display device according to claim 2, wherein the insertion member is sandwiched in a state that another portion of the insertion member is engaged with a projecting portion integrally formed with the mold frame.

4. A liquid crystal display device according to claim 2, wherein the insertion member is sandwiched in a state that another portion of the insertion member is engaged with the liquid crystal display panel.

5. A liquid crystal display device according to claim 2, wherein the insertion member is a spacer.

6. A liquid crystal display device according to claim 5, wherein the spacer is made of foamed rubber having resiliency.

7. A liquid crystal display device according to claim 1, wherein the backlight is a side-light-type backlight which uses a fluorescent discharge lamp.

8. A liquid crystal display device according to claim 1, wherein the backlight is a direct-light-type backlight which uses a fluorescent discharge lamp.

9. A liquid crystal display device according to claim 1, wherein the same surface of the mold frame in which the liquid crystal display panel and the drive printed circuit board are mounted is an upper surface of the mold frame extending in one direction and faces both of the liquid crystal display panel and the drive printed circuit board.

10. A liquid crystal display device according to claim 1, wherein one portion of the insertion member is disposed within the gap so as to be sandwiched between the liquid crystal display panel and the drive printed circuit board.

* * * * *